United States Patent

Kobylak

[15] 3,644,259
[45] Feb. 22, 1972

[54] METHOD FOR MAKING BREATHABLE POLYVINYL CHLORIDE FILM

[72] Inventor: Joe Kobylak, Berea, Ohio
[73] Assignee: The B. F. Goodrich Company, New York, N.Y.
[22] Filed: Oct. 24, 1969
[21] Appl. No.: 869,363

[52] U.S. Cl. ............260/29.6 MH, 260/29.6 MM, 260/31.6, 260/31.8 H, 260/33.6 U, 260/80.77, 260/86.3, 260/87.1, 260/87.5 C, 260/92.8 A
[51] Int. Cl. ................C08f 29/18, C08f 45/42
[58] Field of Search ................260/29.6 T, 29.6, 29.6 RB, 260/29.6 MM, 92.8 A, 33.6 U, 87.5 C, 87.7, 80.77, 31.6, 31.8 H

[56] References Cited

UNITED STATES PATENTS

| | | | |
|---|---|---|---|
| 2,446,806 | 8/1948 | Bernard | 260/29.6 X |
| 2,467,352 | 4/1949 | Williams | 260/29.6 |
| 2,668,159 | 2/1954 | Armatys | 260/29.6 X |
| 2,985,605 | 5/1961 | Hudson et al. | 260/29.6 X |
| 3,218,278 | 11/1965 | Leydon et al. | 260/29.6 X |
| 3,301,919 | 1/1967 | Cenci et al. | 260/29.6 X |
| 3,445,272 | 5/1969 | Newton | 260/29.6 X |
| 2,825,711 | 3/1958 | Mayfield | 260/31.8 |
| 3,066,110 | 11/1962 | Cornell | 260/30.4 |
| 3,542,713 | 11/1970 | Gillio-tos et al. | 260/92.8 A X |

Primary Examiner—William H. Short
Assistant Examiner—L. M. Phynes
Attorney—J. Hughes Powell, Jr. and Ernest K. Bean

[57] ABSTRACT

Breathable polyvinyl chloride film in thicknesses from about 1 to 5 mils and having moisture vapor transmission rates above 50 are prepared by casting a mixture of a vinyl chloride resin, solvent naphtha, a plasticizer and water and heating to dry and fuse the film.

5 Claims, No Drawings

METHOD FOR MAKING BREATHABLE POLYVINYL CHLORIDE FILM

BACKGROUND OF THE INVENTION

Breathable polyvinyl chloride films have many applications. Because of the wearing and other qualities of polyvinyl chloride film, such material is used in upholstery, wearing apparel, disposable protective clothing, tents, and the like where moisture vapor transmission is necessary. Many proposals have been made for obtaining such breathable polyvinyl chloride films, including, for example, compounding water-soluble materials in the polyvinyl chloride which are later leached out, blowing compositions with chemical blowing aids and the like. These are often complex, costly and difficult to control. A simple, inexpensive procedure for forming breathable polyvinyl chloride film has been the objective of those skilled in the art.

SUMMARY OF THE INVENTION

Breathable polyvinyl chloride film is readily prepared by mixing 100 weight parts of a vinyl chloride polymer dispersion resin, about 25 to 75 weight parts of solvent naphtha or its equivalent aliphatic hydrocarbon material, a liquid plasticizer in amounts from about 50 to 160 weight parts and 100 to 300 weight parts of water, casting a film of about 1 to about 3 mil thickness and heating to dry and fuse the resulting cast film. In accordance with this process, breathable polyvinyl chloride films are obtained having moisture vapor transmission rates (MVTR) greater than 50 to above 200. The MVTR may be controlled by varying the ratio of and amounts of solvent naphtha and water, as well as by the addition of inorganic fillers for example, zinc oxide.

DETAILED DESCRIPTION

The vinyl chloride resins are the homopolymers of vinyl chloride, copolymers and interpolymers of at least 70 percent by weight of vinyl chloride and up to about 30 percent, preferably less than 10 percent, by weight of one or more other vinylidene monomers copolymerizable with vinyl chloride. For the purpose of this invention the other vinyl monomers which may be included in addition to the essential vinyl chloride in the polyvinyl chloride resins are those monomers having a terminal $CH = C<$ grouping. Such monomers include the other vinyl halides such as vinyl bromide, vinyl fluoride, vinylidene chloride, vinylidene bromide, vinyl fluoride, vinylidene chloride, vinylidene bromide, vinylidene fluoride, chlorotrifluoro ethylene, 1,2-dichloroethylene, tetrafluoroethylene, and the like; the vinyl esters such as vinyl acetate, vinyl propionate, vinyl butyrate, vinyl benzoate, vinyl laurate, isopropenyl acetate, isopropenyl caproate, and the like; the acrylate and methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate, and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diamyl fumarates, the dihexyl fumarates, the diheptyl fumarates, the dioctyl fumarates, the didecyl fumarates, dicyclohexyl fumarate and the like; the vinyl aromatic monomers such as styrene, $\alpha$-methyl styrene, the vinyl toluenes, the vinyl xylenes, vinyl naphthalene, and the like; monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ethers, vinyl phenyl ether, vinyl benzyl ether, and the like; the allylesters and ethers such as allyl acetate, allyl laurate, allyl benzoate, allyl methyl ether, allyl ethyl ether and the like; vinyl cyanides such as acrylonitrile, methacrylonitrile, vinylidene cyanide and the like and others. Most preferred in this invention is an emulsion-polymerized, dispersion-grade homopolymer of vinyl chloride.

The first essential ingredient is an aliphatic petroleum base hydrocarbon generally referred to as varnish makers and painters naphtha (VMP), ligroin, mineral spirits, refined solvent naphtha or petroleum benzin. These materials contain essentially a mixture of hexanes and heptanes, and normally distill in the range of about 90 percent below 200° C. According to the ASTM specifications high-grade VMP material should distill at not more than 5 percent at 130° C., not less than 9 percent at 145° C. and the dry point not above 155° C. The specific gravity of the hydrocarbon solvent is in the range of about 0.77 to 0.8. An aliphatic solvent containing about five to eight carbon atoms, preferably the major proportion containing six to seven carbon atoms, are satisfactory in the practice of the invention. Aromatic and polar solvents as xylene, benzene, diisobutyl ketone and the like have been found to be unsatisfactory in obtaining the desired breathable polyvinyl chloride film. The amount of such solvents employed will be greater than about 25 parts per 100 parts of polyvinyl chloride to about 80 parts, more preferably 30 to 60 parts. Within this range, with 100 parts of water, moisture vapor transmission rates of about 50 to greater than 200 were obtained.

The other essential ingredient of the compound is water and the amount of water used in the compound should be at least about 100 weight parts per 100 of polyvinyl chloride to less than about 300 weight parts. It will be understood, of course, that when larger amounts of solvents are used, lesser amounts of water may be used to obtain an equivalent MVTR, and with larger amounts of water, lesser amounts of solvent may be employed.

The plasticizer used should be a liquid plasticizer of the type normally employed by those skilled in the art in making plastisol formulations. Generally useful are liquid plasticizers described as the alkyl and alkoxy alkyl esters of dicarboxylic acids or the esters of a polyhydric alcohol and a monobasic acid as the liquid diesters of aliphatic alcohols having from four to 20 carbon atoms and dibasic carboxylic acids having from six to 14 carbon atoms. Typical plasticizers include tricresyl phosphate, dioctyl phthalates, dioctyl adipate, dioctyl sebacate, dioctyl phthalates, dicapryl phthalates, the polymeric plasticizer reaction products of adipic or azaleic acid with a glycol such as propylene glycol, epoxidized soy oils and phthalates, methyl acetyl recinoleate, tetraethylene glycol derivatives of $C_6$–$C_{10}$ alcohols and the like, as well as secondary plasticizers will known by those skilled in the art. The amount of liquid plasticizer employed will vary from about 50 to about 160 parts per 100 parts of vinyl chloride polymer.

Any of the standard stabilizers to protect the film from degradation by heat and/or light may be used. Typical stabilizers are cadmium alkylaryl phosphites, barium-cadmium laurate, barium recinoleate, barium zinc phosphite, tin mercaptides, triaryl phosphites and the like. The amount of stabilizer, of course, will be varied in amounts from 1 to 5 weight parts per 100 of vinyl chloride polymer.

Inorganic fillers of the type normally used in compounding vinyl chloride polymer plastisols may be used including finely divided metal oxides as titanium dioxide, zinc oxide, magnesium oxide and the like.

The plastisol compositions are easily and readily prepared by mixing the necessary ingredients in high-speed, high-shear commercial mixers so as to obtain adequate mixing of the necessary ingredients. No particular order of mixing is required. Normally, the liquid ingredients of the plastisol or paste are premixed and thereafter the powder ingredients slowly blended in. The resulting compounds may then be cast into films by the many procedures known to those skilled in the art and the resulting film heated to dry and fuse the film. Normally these temperatures range from about 300° F. to 400° F.

To demonstrate the practice of the invention, a series of compositions prepared as described demonstrate the effect of varying amounts of water, solvent naphtha and a filler, zinc oxide, on the MVTR of cast films. All of the plastisol compositions were prepared by mixing in a Waring blendor. The liquid ingredients were premixed for 1 minute, followed by the slow addition for a period of about 1 minute of a blend of the powder ingredients, and this allowed to mix for about 3 more minutes at a temperature of about 48° C. Samples of the resulting compounded plastisols were cast with an adjustable drawbar and fused on ferrotype plates for 5 minutes at 325° F. The resulting permeable films had thicknesses in the range of about 1 to 2 mils. The samples were tested for moisture vapor transmission rate by conditioning for 30 minutes at 95±2 percent relative humidity at 100° F. and then exposed for 3 hours to the same conditions. The MVTR is expressed as grams/100 in.²/24 hours. A control plastisol compound for comparison was prepared with 100 parts of the polyvinyl chloride, 70 parts of dioctyl phthalate, 0.5 part of an antifoaming agent and 3 parts of a barium-cadmium-zinc commercial stabilizer.

The effect on MVTR of varying the solvent naphtha is illustrated using the following recipe:

| | |
|---|---|
| Geon 121 | 100 weight parts |
| Dioctylphthalate | 70 weight parts |
| Zinc oxide | 20 weight parts |
| Antifoam | 0.5 weight part |
| VMP | Variable |
| Barium-cadmium-zinc stabilizer | 3 |
| Water | 100 |

With 40 weight parts of VMP per 100 of polyvinyl chloride (Geon 121), the MVTR was 51. With 50 parts, the MVTR was 149. With 60 parts, the MVTR was 206. The control had an MVTR of 23.

To demonstrate the effect of varying the water content of the plastisol formulations, the same recipe was used except water was the variable and 30 parts of VMP was employed. With 150 weight parts of water per 100 weight parts of polyvinyl chloride in this recipe, the MVTR was 72. With 175 parts of water, the MVTR was 95. With 200 parts of water, the MVTR was 102.

To demonstrate the effect on the MVTR of varying amounts of filler, the same recipe first set forth above was used with water 100, VMP 30 and the zinc oxide varied. With no zinc oxide, the MVTR was 142. With 5 weight parts, the MVTR was 138. With 10 parts, the MVTR was 93. With 15 parts, the MVTR was 78. With 40 parts, the MVTR was 66 and with 45 parts, the MVTR was 62. With the fillers such as titanium dioxide and Lesamite, similar results were observed in controlling MVTR with fillers. Twenty parts of Titania gave a film with MVTR of 61. Other solvent naphtha including mineral spirits demonstrate equivalent results to VMP. Other known plasticizers as dioctyl adipate, dioctyl sebacate and the like are equally effective as in many plastisol formulations.

As disclosed, any vinyl chloride polymer of dispersion or paste resin grade may be used. Geon 121 is a polyvinyl chloride having a specific gravity of 1.4, bulk density of 20–25/lbs./cu.ft. and an inherent viscosity of 1.20. The finely divided Geon 121 passes 100 percent through both a 100 and 200 mesh screen. Excellent results are obtained with dispersion resins having particular size distribution generally over the range of about 300 to 20,000 A. and having inherent viscosities (ASRM-D-1243-60-A) in the range of about 0.65 to about 1.20. The antifoaming agent of the above recipe may be any of the antifoaming agents normally employed and in these recipes was a liquid polydimethyl siloxane compound having a specific gravity at 77° F. of 0.98. While a stabilizer is not necessary for the demonstration of the permeability of the cast films, in commercial applications a stabilizer is added of a type well known to those skilled in the art.

I claim:

1. A casting composition comprising a vinyl chloride polymer paste resin having a particle size range of about 300 to 20,000 A., said polymer containing at least 70 weight percent vinyl chloride and less than about 30 percent of one or more vinylidene monomers having a terminal $CH = C<$ grouping, a liquid plasticizer therefor selected from the group consisting of alkyl and alkoxyalkyl esters of dicarboxylic acids and esters of polyhydric alcohols and monobasic acids, a liquid aliphatic hydrocarbon containing five to eight carbon atoms and distilling in the range of about 90 percent below 200° C. and water, in amounts of about 50 to 160 weight parts of plasticizer, 25 to 75 weight parts of liquid hydrocarbon and 100 to less than 300 weight parts of water based on 100 weight parts of vinyl chloride polymer.

2. The composition of claim 1 wherein the vinyl chloride is polyvinyl chloride and there is 30 to 60 weight parts of liquid aliphatic hydrocarbon.

3. The composition of claim 2 wherein there is about 150 to 250 weight parts of water.

4. The composition of claim 3 wherein the liquid plasticizer is a liquid diester of an aliphatic alcohol containing four to 20 carbon atoms and a dibasic carboxylic acid containing six to 14 carbon atoms present in amounts from about 60 to about 100 weight parts.

5. The composition of claim 1 containing up to about 45 parts of zinc oxide based on 100 weight parts of vinyl chloride polymer.

\* \* \* \* \*